(12) United States Patent
Christian et al.

(10) Patent No.: US 11,956,022 B2
(45) Date of Patent: Apr. 9, 2024

(54) LASER PROPAGATION PATH OF THE AIR INTERFACE FOR FIXED WIRELESS ACCESS DEVICES

(71) Applicant: T-MOBILE INNOVATIONS LLC, Overland Park, KS (US)

(72) Inventors: Brett L. Christian, Independence, MO (US); Michael Scott Probasco, Bedford, TX (US); George Frantz Cummings, III, Gilbert, AZ (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/865,180

(22) Filed: Jul. 14, 2022

(65) Prior Publication Data

US 2024/0022332 A1 Jan. 18, 2024

(51) Int. Cl.
*H04B 10/00* (2013.01)
*G01S 17/95* (2006.01)
*H04B 10/50* (2013.01)
*H04B 10/508* (2013.01)

(52) U.S. Cl.
CPC .......... *H04B 10/508* (2013.01); *G01S 17/95* (2013.01); *H04B 10/503* (2013.01)

(58) Field of Classification Search
CPC .............. H04B 10/27; H04B 10/2575; H04B 10/25752; H04B 10/25753; H04B 10/40; H04B 10/508; H04B 10/503; H04B 10/0795; H04B 10/1123; H04B 10/1143; H04B 10/1125; H04B 10/1127; H04B 10/118; A01G 15/00

USPC ....... 398/66, 67, 68, 69, 72, 115, 33, 38, 25, 398/26, 27, 135, 136, 118, 119, 121, 127, 398/128, 130, 131, 129, 183, 159; 239/2.1, 14.1
See application file for complete search history.

(56) References Cited

U.S. PATENT DOCUMENTS 8,923,701 B2 * 12/2014 D'Errico ............ H04B 10/1123
398/19
9,526,216 B2 * 12/2016 Caldeira ................ A01G 15/00
(Continued)

OTHER PUBLICATIONS

Chen S., "Physicists Clear the Air With a Sweet Frickin' Laser Beam", Wired, Retrieved from Internet URL : https://www.wired.com/story/physicists-clear-the-air-with-a-sweet-frickin-laser-beam/, accessed on Sep. 27, 2023, pp. 1-12 (Apr. 29, 2020).
(Continued)

*Primary Examiner* — Hanh Phan
(74) *Attorney, Agent, or Firm* — Shook, Hardy & Bacon L.L.P.

(57) ABSTRACT

Systems and methods are provided for improving signal propagation using lasers. A laser device is used to clear the air between a first fixed station, such as a base station, and a second fixed station, such as a fixed wireless access device. In the wake of the laser, particles in the air interface are cleared along a path that can then be used to communicate one or more sets of wireless signals. In the wake of the laser, the wireless signals experience less absorption, reflection, and refraction, reducing path loss, and increasing the overall effectiveness of the wireless system—particularly at or near the cell edge or when a meteorological condition exists between the fixed stations.

20 Claims, 4 Drawing Sheets

(56) References Cited

U.S. PATENT DOCUMENTS

2004/0037566 A1* 2/2004 Willebrand ........ H04B 10/1123
398/115
2020/0275517 A1* 8/2020 Ashrafi ................ H04W 76/22

OTHER PUBLICATIONS

Schroeder M.C., et al., "Molecular quantum wakes for clearing fog", Optics Express, vol. 28, Issue. 8, pp. 11463-11471 (Apr. 13, 2020).

* cited by examiner

LASER PROPAGATION PATH OF THE AIR INTERFACE FOR FIXED WIRELESS ACCESS DEVICES

SUMMARY

The present disclosure is directed, at least in part, to utilizing a laser to improve the propagation path for radio frequency signaling in the air interface between a base station and a fixed wireless access device, substantially as shown in and/or described in connection with at least one of the figures, and as set forth more completely in the claims.

In aspects set forth herein, a laser is used to improve transmittance of the air interface along a propagation path between a wireless base station and a fixed wireless access device. Modern telecommunication networks utilize radio frequency (RF) signaling to transmit and receive signals between a base station and a user equipment. Particularly for non-mobile or low-mobility fixed wireless access (FWA) devices, an atmospheric event/obstacle such as fog, clouds, precipitation, smoke, or smog may cause user-discernable degradation of service by way of decreasing the transmittance of the air interface; the relatively low mobility of the FWA device in view of a potentially lingering atmospheric condition means the user has little or no ability to adjust or manipulate the FWA device to improve the wireless connection. Instead, the user must wait until atmospheric conditions improve. Particularly at or near a cell-edge, an FWA device may be rendered unusable as a result of the aforementioned atmospheric degradation. By utilizing a laser along at least a portion of the propagation path of the RF signals between the base station and the FWA device, the atmospheric conditions could be sufficiently improved sufficient to mitigate or entirely abate the degradation caused by the adverse atmospheric condition.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless telecommunications network employs a plurality of base stations to wirelessly transmit signals to a user device and wirelessly receive signals from the user device. In a wireless communication system, there are numerous factors that can affect signal propagation. Signal path loss ("path loss"), or signal path attenuation, refers to the reduction in power density of an electromagnetic wave as it propagates through space. Path loss is a major component in the analysis and design of a telecommunications system. Path loss may be due to many effects, such as free-space loss, refraction, diffraction, reflection, aperture-medium coupling loss, and absorption. Path loss is also influenced by terrain contours, environment (e.g., urban or rural, vegetation and foliage), propagation medium (e.g., dry or moist air), the distance between the transmitter and the receiver, and the height and location of antennas. Generally, wireless telecommunication networks exist to wirelessly link UEs to a broader voice and data network. Increasingly, Fixed Wireless Access (FWA) devices are being used to extend the usefulness of wireless networks to areas that were traditionally difficult to reach; whether in the form of consumer premises equipment, relays, or small cells, a fixed wireless access device can utilize a fixed (relative to mobile devices) backhaul connection to a radio access network (RAN) to provide wireless service to one or more UEs. A typical deployment might include in residential housing or office buildings, where UEs within the structures can access the RAN, via the FWA device.

Conventionally, when wireless communication systems utilize the air interface, they are at the mercy of atmospheric conditions. That is, particles in the air, including particulates, pollutants, salts, dust, and much more can absorb, reflect, and/or refract wireless signals. Meteorological conditions such as fog, rain, snow, and clouds can have an even greater adverse effect. Such an adverse effect can reduce the usable range of the wireless signals, leading to the need for increased densification of network resources to avoid users having their wireless sessions fail or suffer attenuation. In order to deal with this problem today, a network operator may deploy base stations or other assets that are extraneous when adverse atmospheric conditions do not exist, leading to potentially massive and unnecessary expenditures in initial resources, power, maintenance, and financial cost. Otherwise, network operators—and their subscribers—must simply wait out the adverse condition.

In contrast to conventional solutions, the present technology uses laser energy to enhance the propagation paths in wireless communications. In one example, a laser emitter can generate pulses of laser light that are emitted toward a target fixed station, particularly when the fixed station is in Line-of-Sight (LOS) of the laser emitter. When the laser emitter is mounted on a base station, it can clear a propagation path to the fixed station when in LOS to enhance signal propagation. In another example, the laser emitter can clear at least a portion of the propagation path even when the fixed station is not in LOS of the laser emitter. The pulsed laser can enhance signal propagation in at least two ways. First, laser energy can enhance ionization of the air in a communication channel over the propagation path, which improves radio propagation characteristics (e.g., reflection, diffraction, and scattering). Second, the laser energy can shock the air in a manner that lowers moister on the propagation path, again enhancing path propagation and thus network coverage. This form of laser-based enhancement can mitigate the undesired effects on coverage caused by atmospheric, meteorological, and environmental conditions to improve signal strength—particularly for fixed stations that are at or near the cell edge or otherwise experiencing degraded connectivity.

Accordingly, a first aspect of the present disclosure is directed to a method for using lasers to improve radio frequency (RF) signal propagation. A method for using a laser to improve wireless signal propagation, the method comprises determining a fixed wireless access device is connected to a base station configured to transmit one or more downlink signals and receive one or more uplink signals within a cell. The method further comprises determining one or more network parameters associated with the connection between the fixed wireless access device and the base station exceeds a predetermined threshold. The method further comprises determining the fixed wireless access device is within a predetermined distance of the cell edge. The method further comprises determining an adverse atmospheric condition is occurring along a communication path between the base station and the fixed wireless access device. The method further comprises communicating an instruction to a laser to emit a first set of one or more pulses during a first laser transmission period at least partially along the communication path. The method further comprises communicating the one or more downlink signals from the base station to the fixed wireless access device along the communication path Another aspect of the present disclosure is directed to a system for using a laser to improve RF propagation between two fixed stations. The system comprises a first fixed station configured to transmit one or more wireless downlink signals to a second fixed station. The system further comprises a laser device. The system further comprises one or more computer processing components configured to perform a method comprising determining one or more network parameters associated with the connection between the first fixed station and the second fixed station exceeds a predetermined threshold, wherein said connection is used to communicate the one or more wireless downlink signals. The one or more computer processing components are further configured to communicate an instruction to the laser device to emit a first set of one or more pulses during a first laser transmission period at least partially along a communication path. The one or more computer processing components are further configured to communicate the one or more downlink signals from the first fixed station to the second fixed station along the communication path.

Yet another aspect of the present disclosure is directed to a non-transitory computer readable media having instructions stored thereon, that when executed by one or more computer processing components, cause the one or more computer processing components to perform a method for using a laser to improve RF propagation between a base station and a fixed wireless access device. The method comprises determining one or more network parameters associated with a connection between a first fixed station and a second fixed station exceeds a predetermined threshold, wherein said connection is used to communicate one or more wireless signals. The method further comprises communicating an instruction to a laser device to emit a first set of one or more pulses during a first laser transmission period at least partially along a communication path used to communicate the one or more wireless signals. The method further comprises communicating the one or more downlink signals from the first fixed station to the second fixed station along the communication path during a recovery time period following the first laser transmission period.

Figure 1:
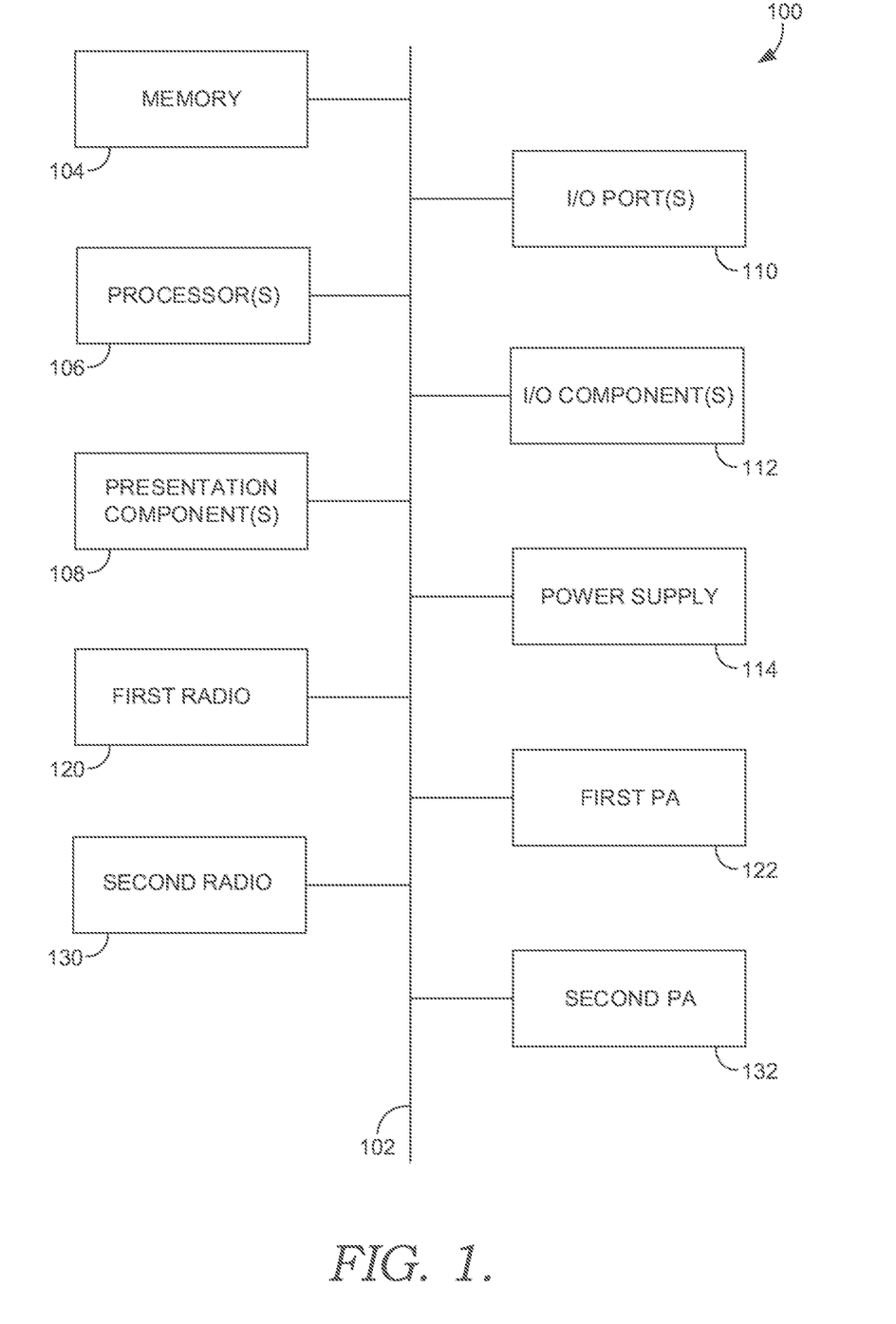
FIG. 1 depicts an exemplary computing environment suitable for use in implementations of the present disclosure.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
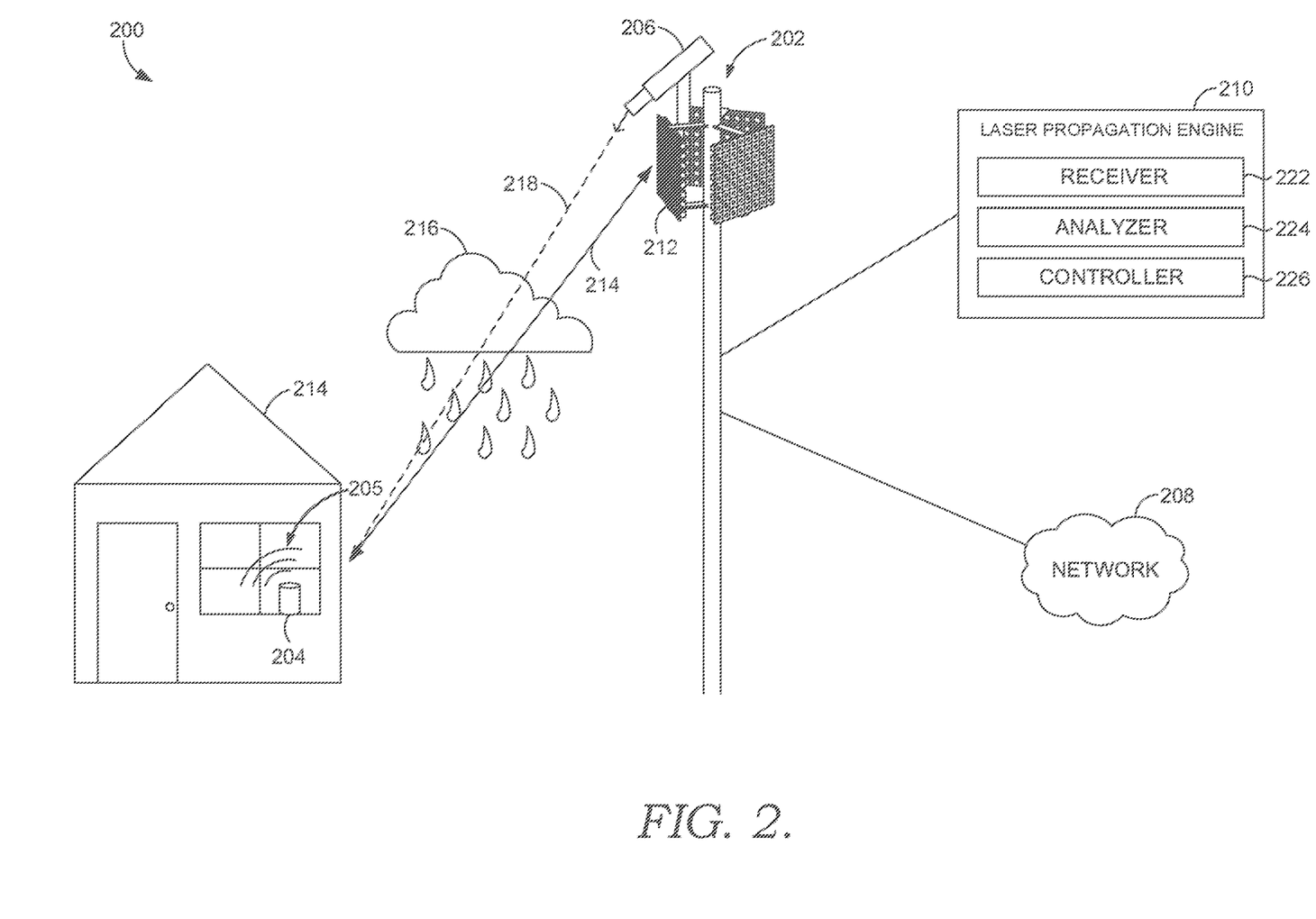
FIG. 2 depicts an exemplary system in which implementations of the present disclosure may be employed.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated.

The network environment 200 generally represents a high-level model for wirelessly communicating between a base station and a fixed wireless access device, as discussed in greater detail herein. The network environment 200 comprises a base station 202, a fixed wireless access device 204, a laser device 206, and a network 208. The network environment 200 may also be said to comprise a network 208, and one or more computer processing components that form a laser propagation engine 210.

The network environment comprises at least one base station 202 that is configured to wirelessly communicating with one or more user devices, such as the computing device 100 of FIG. 1, which may take the form of the fixed wireless access device 204. For the purposes of this disclosure, a base station is used in its general sense, being defined as a station for transmitting and/or receiving RF signals; accordingly, the base station 202 may take the form of a cellular node (e.g. eNodeB, gNodeB, etc.), a relay, or any other desirable emitter and/or receiver of signals that remains fixed in place while a set of wireless signals are transmitted/received. A suitable base station is not protocol-specific, it may be configured to be any wireless telecommunication protocol that is compatible with the user device 230, such as 4G, 5G, 6G, or any other wireless standard. A suitable base station is also not exclusive to cellular telecommunication networks, it may take the form of any wireless communication system and used at any desirable frequency (e.g., microwave relays). Base stations consistent with the present disclosure may be configured to serve a certain geographic area (i.e., a cell) and will have one or more backhaul connections that connect it to a broader telecommunications network, such as the network 208, for the provision of telecommunication service to the fixed wireless access device 204. As illustrated, the base station 202 may take the form of a macro cell; however, the base station 202 may take any desirable form, such as a small cell. As seen in the embodiment illustrated by FIG. 2, base stations suitable for use in the present disclosure may be terrestrial, that is, they are coupled to the earth via a tower or some other structure, such as the first base station 210; alternatively, a suitable base station may be extra-terrestrial, that is coupled to an aircraft or a satellite.

In order to communicate with the fixed wireless access device 204, the base station 202 may be said to communicate along a communication path 214 of the air interface, wherein one or more sets of downlink signals are sent to the fixed wireless access device 204 from the base station 202 and one or more sets of uplink signals are communicated from the fixed wireless access device 204 to the base station 202. Though illustrated as a straight line representing a single, direct, line of sight connection, one skilled in the art will appreciate that the reality of RF communications means that the communication path 214 may not be singular (i.e., there may be multiple paths), may not be direct (i.e., there may be reflections and/or refractions that cause the communication path 214 to have multiple or indirect paths), and it may not be line of sight (i.e., the communication path 214 may be reflected off structures, the ground, or the ionosphere, whether or not a direct line of sight connection exists). Though a single base station is illustrated in FIG. 2, the network environment 200 may comprise multiple base stations, including multiple base stations that serve the same fixed wireless access device 204, such as through the use of dual connectivity technology; further, additional base stations may provide overlapping or auxiliary coverage in the event an outage occurs at the base station 202. Each base station of the network environment 200, including the base station 202, comprises one or more antennas 212 that propagate to or receive signals from the air interface. Though illustrated in FIG. 2 as an antenna array, the one or more antennas 212 of the base station 202 may take any desirable form, configured for the particular types of signaling between the base station 202 and the fixed wireless access device 204, including omni-directional, dipoles, single antenna systems, antenna arrays such as multiple-input, multiple-output (MIMO) and single-input, single-output (SISO) arrays, massive MIMO, and many others. For the purposes of present disclosure, it is sufficient to illustrate that one or more sets of downlink signals originate from, and one or more uplink signals are received at, the one or more antennas 212 and the communication path 214 bridges the one or more antennas 202 and the fixed wireless access device 204.

The network environment further comprises at least one fixed wireless access device 204. The fixed wireless access device 204 may be said to include any one or more components of the computing device 100 of FIG. 1. Generally, the fixed wireless access device 204 provides wireless connectivity between the fixed wireless access device 204 and the base station 202 and then provides a connection to other devices in proximity to the wireless access device 204. Accordingly, and despite the fact that the fixed wireless access device 204 is illustrated in FIG. 2 and described with specificity herein as a home internet gateway, any fixed station suitable for wirelessly communicating with the base station 202 is suitable for use with the present invention; for example, the fixed wireless access device 204 could take the form of a second base station (e.g., a macro or small cell), a consumer premise equipment (CPE), access point, relay, and the like. A typical deployment scenario for the fixed wireless access device 204 is within a structure 214, within which signals from the base station 202 may be attenuated to the point that they degrade the ability of UEs within the structure 214 to access one or more services of the network 208, to which the base station 202 is connected. Accordingly, a fixed wireless access device consistent with the present disclosure may comprise a processor 106, power supply 114, radio 116, and bus 102. Because the fixed wireless access device is not typically configured for extensive interactions with users, such a device may not comprise a presentation component 108 or the I/O port(s) 110. In other aspects, the presentation component 108 may comprise a display of reduced size. The fixed wireless access device 204 may comprise an I/O port, whether wired or wireless, that provides a connection interface between the fixed wireless access device and other routing device or UEs. For example, the fixed wireless access device 204 may be configured to transmit a set of wireless signals 205 to one or more wireless communication devices (not illustrated) within the structure 214; the set of wireless signals 205 may be configured according to any desirable wireless communication standard, such as 802.11 series or conventionally-cellular standards such as 3G/4G/5G/6G, and the like. Additionally or alternatively, the fixed wireless access device 204 may be configured with a wired communication port, such as an Ethernet port, that provides a wired connection to a user device (e.g., a personal computer) or to a router (e.g., a whole-home router, mesh network router, etc.).

The network environment 200 further comprises a laser device 206. The laser device 206 is generally configured to at least partially mitigate path loss of the one or more downlink signals and/or the one or more uplink signals communicated between the fixed base station 202 and the fixed wireless access device 204 along the communication path 214. As used herein, the laser device 206 refers to a device that emits amplified light based on the stimulated emission of radiation. Any laser emitting device may be suitable for use as the laser device 206 that is capable of at least partially clearing the air along the communication path 214. For example, the laser device may be capable of at least partially ionizing and/or rotationally heating the air interface along the communication path 214. If the laser device 206 is capable of at least partially ionizing the air along the communication path 214, then particles along the communication path 214 (e.g., dust, salts, gasses, vapors, etc.) may be at least partially broken up, reducing the density of the air along the communication path 214 and therefore improving propagation of desirable RF signals. If the laser device 206 is capable of at least partially rotationally heating the air along the communication path 214, particularly in resonance, then it can create a quantum shockwave away from the axis of the laser emission, referred to herein as a laser path 218; when the laser path 218 is otherwise obstructed by an adverse atmospheric condition 216 (e.g., fog, precipitation, a cloud, or any other water-based plurality of particles), the quantum shockwave has the effect of causing a wake of relatively cleared air (relative to the adverse atmospheric condition) for a period of time known as a recovery time period. When the one or more sets of downlink signals or the one or more sets of uplink signals are communicated along the laser path 216 during the recovery time period (i.e., in the wake of the laser), they experience less reflection and refraction, improving propagation by reducing path loss.

In aspects, the laser device 206 is configured to emit light which is coherent. Spatial coherence allows a laser to be focused to a particular target, such as the fixed wireless access device 204. Spatial coherence also allows a laser beam to stay narrow over great distances. Lasers can also have high temporal coherence, which allows them to emit light with a very narrow spectrum. Alternatively, temporal coherence can be used to produce ultrashort pulses of light with a broad spectrum but durations as short as a femtosecond. Spatial (or transverse) coherence is typically expressed through the output being a narrow beam. Laser beams can be focused to very small target spots, achieving a very high irradiance, or they can have very low divergence in order to concentrate their power at a great distance. Temporal (or longitudinal) coherence implies a polarized wave at a single frequency, whose phase is correlated over a relatively great distance (the coherence length) along the beam. The laser emitters of the disclosed technology generally use a pulsed operation of lasers, which refers to any laser not classified as continuous wave, so that the optical power appears in pulses of some duration at some repetition rate. In an example, an application requires the production of pulses having large energy. Since the pulse energy is equal to the average power divided by the repetition rate, this goal can sometimes be satisfied by lowering the rate of pulses so that more energy can be built up in between pulses.

The laser device 206 may be integrated into the one or more antenna systems 212 of the base station 202, it may be disposed proximate to the one or more antenna systems 212, or it may be wholly distinct from the one or more antenna systems 212 and the base station 202. Generally, the greater the overlap between the laser path 218 and the communication path 214, the more cleared air the RF signals travel through, maximizing the effect of the laser propagation enhancement disclosed herein. Each sector of a cell served by the base station 202 may have its own laser device 206, each sector of the cell served by the base station 202 may have multiple laser devices that are configured to separately create a laser path to each of a plurality of antennas of the fixed wireless access device, or a single laser device 206 may be used throughout multiple sectors of the cell. If the laser device 206 is sector-specific, it may be integrated into an antenna panel of the one or more antenna systems 212 so that the laser path 218 is substantially (+/− 10 degrees) coaxial with the communication path 214; for example, the laser device 206 may be mounted slightly behind and orthogonal to the emitting face of the one or more antenna systems 212, wherein the laser device 206 is configured to utilize one or more angular mirrors to adjust the angle of the laser path 218 in two or more dimensions. In another aspect, the laser device 206 may be coupled to the antenna panel in a way that is particularly conducive for retrofitting existing antenna systems (for example, by mounting the laser device 206 on a perimeter edge of the sector antenna) to ensure substantial coaxiality. The laser device 206 may be selected on the basis of beam width or have a configurable beam width, to ensure that the laser path 218 and the communication path are at least substantially coaxial along a portion of a distance between the base station 202 and the fixed wireless access device 204; that is, a larger diameter beam width may be used when the laser path 218 is less coaxial with the communication path 214 and a small diameter beam width may be used when the laser path is more coaxial with the communication path 214.

The network environment 200 further comprises an adverse atmospheric condition 216. The phrase "adverse atmospheric condition," as used herein, refers to a general condition wherein one or more particles at least partially obstructs the communication path 214. The adverse atmospheric condition 216, though illustrated as meteorological, may take the form of dust, smoke, pollutants, salts, vapors, or any other particle not traditionally considered meteorological-related. In other aspects, the adverse atmospheric condition 216 may comprise a meteorological condition such as fog, smog, clouds, precipitation, and the like. Regardless of the particular particles comprising the adverse atmospheric condition, it is sufficient for the purposes of the present disclosure that the common property of the adverse atmospheric condition is its negative impact on RF propagation, chiefly by way of causing increased path loss due to absorption, reflection and/or refraction of RF signals.

In some aspects, the network environment comprises 200 comprises the network 208. The network 208 comprises any number of components that are generally configured to provide voice and/or data services to wireless communication devices, such as the fixed wireless access devices 204, which are wirelessly connected to the base station 202. For example, the network 208 may comprise one or more additional wireless base stations, a core network, an IMS network, a PSTN network, or any number of servers, computer processing components, and the like. The network 208 may include access to the World Wide Web, internet, or any number of desirable data sources which may be queried to fulfill requests from wireless communication devices that make requests via the base station 202.

The network environment 200 comprises one or more computer processing components that form a laser propagation engine 210. The laser propagation engine 210 may comprise one or more components, taking the form of any combination of hardware components, logical components, and computer-programmed services running on one or more computer processing components that are generally configured to collectively control the operation of the laser device 206. The laser propagation engine 210, including its one or more subcomponents, may be disposed at or near the base station 202, or within or adjacent to the network 208. According to the present disclosure, the subcomponents of the laser propagation engine 210 are divided by function; however, more or fewer components may carry out the functions of the laser propagation engine 210, and the functionality described herein with respect to particular subcomponents of the laser propagation engine 210 may be performed by other subcomponents of the laser propagation engine 210 without departing from the inventive concept conceived herein. Accordingly, the laser propagation engine 210 may be said to comprise a receiver 222, an analyzer 224, and a controller 226.

Figure 3:
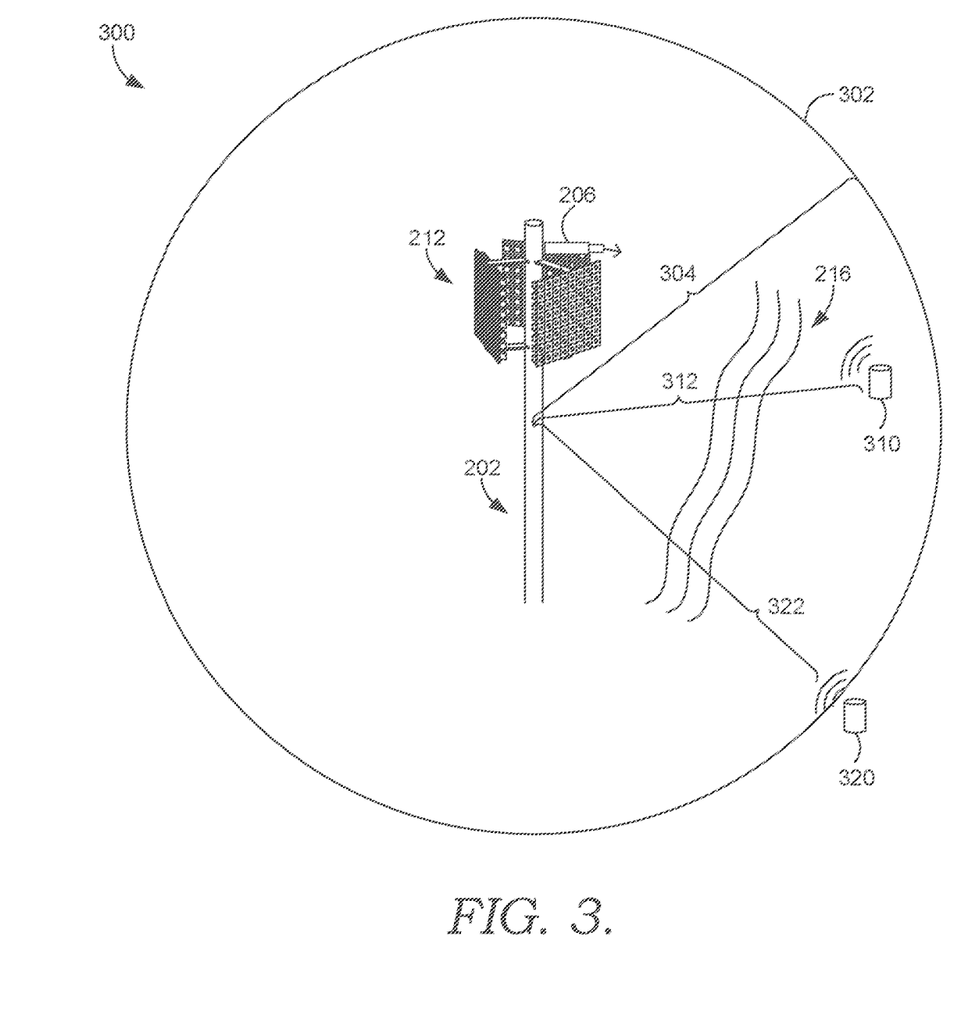
FIG. 3 depicts an exemplary network in which implementations of the present disclosure may be employed.

The receiver 222 is generally configured to receive information relating to the network environment 200. The receiver 222 may receive, from the base station 202, an indication that the fixed wireless access device 204 is wirelessly connected to the base station 202. Said indication may include a flag or other indicator that the device type of the fixed wireless access device 204 is a fixed wireless device (e.g., a CPE fixed wireless access device)—as opposed to a mobile device—or it may query a data repository such as unified data repository to determine the device type. In some aspects, the receiver 222 may receive an indication of the location of the fixed wireless access device 204 and a location of a cell edge of the base station 202 (i.e., the anticipated or actual range of the RF signals emitted by the base station 202). For example, turning to FIG. 3, within a network environment 300, the receiver 222 of FIG. 2 may determine (or receive an indication) that the base station 202 of FIG. 2 has a cell edge 302 at a first distance 304 from the base station 202. The receiver 222 of FIG. 2 may further determine (or receive an indication) that a first fixed wireless access device 310 is located at a second distance 312 from the base station 202 and that a second fixed wireless access device 320 is located at a third distance 322 from the base station 202. As seen in the illustration, the first fixed wireless access device 310 may be disposed near (within 20% of the first distance 304) of the cell edge 302, and the second fixed wireless access device 320 may be disposed at or beyond the cell edge 302.

In some aspects, the receiver 222 of FIG. 2 may be configured to receive information that the adverse atmospheric condition 216 of FIG. 2 is occurring between the base station 202 and at least one of the first fixed wireless access device 310 and the second fixed wireless access device 320. In such aspects, the receiver 222 of FIG. 2 may receive RSRP or other information regarding the strength of one or more downlink signals received at various locations within the cell served by the base station 202 that could be used to infer that an adverse atmospheric condition 216 is occurring; for example, a degradation of one or more network parameters such as RSRP beyond a predetermine threshold during a predetermined time period (e.g., 6 dBm drop within 15 minutes). The receiver 222 of FIG. 2 may receive indicators from one or more sensors (e.g., rain gauges, visibility sensors, barometers, weather radar, or other devices that are configured to collect or measure data relating to any one or more adverse atmospheric conditions described herein) that indicate an adverse atmospheric condition is occurring. The receiver 222 of FIG. 2 may receive forecast information that indicates an adverse atmospheric condition is likely to occur at a particular time. The receiver 222 of FIG. 2 may also receive one or more network performance indicators such as throughput, latency, jitter, a power indicator (e.g., RSRP), of a signal quality (e.g., SINR, RSRQ, and the like) associated with a connection between the base statin 202 and each connected fixed wireless access device.

Returning now to FIG. 2, the analyzer 224 is generally configured to determine when and how to operate the laser device 206. The analyzer 224 receives information from the receiver 222 that the base station 202 is wirelessly connected to a fixed wireless access device such as the fixed wireless access device 204 and the location of the fixed wireless access device 204. In one aspect, operation of the laser device 206 is based at least in part on a determination that the fixed wireless access device is within a predetermined range of a cell edge; for example, returning to FIG. 3, the second distance 312 of the first fixed wireless access device 210 from the base station 202 may be at least a predetermined threshold range of the first distance 304 to the cell edge 302 (e.g., within 5, 10, or 20% of the first distance). In another example, the operation of the laser device 206 is based at least in part on a determination that the connection between the base station 202 and the fixed wireless access device 204 could be improved based on one or more network parameters associated with the connection and communicated to the analyzer 224 from the receiver 222; for example, if the RSRP of a downlink signal communicated from the base station 202 to the fixed wireless access device 204 is below a predetermined threshold, or if the RSRQ of the connection between the base station 202 and the fixed wireless access device is below a predetermined threshold. As one skilled in the art will appreciate, many different network parameters and associated thresholds may be utilized alone or in combination as a threshold premise for determining when the laser device 206 should be operated.

In addition to determining when the laser device 206 should be operated, the analyzer 224 may determine how the laser device should be operated. In a first aspect, the analyzer 224 may utilize one or more indications from the receiver 222 as a basis for determining a laser operation mode; for example, if the analyzer 224 receives an indication from the receiver 222 that the adverse atmospheric condition 216 comprises a meteorological-based event (e.g., rain, fog, clouds), then the analyzer 224 may determine that the laser device 206 should operate in a non-ionizing mode (e.g., rotational heating mode), whereas if the analyzer 224 does not receive an indication that the adverse atmospheric condition 216 is meteorological-based, the analyzer 224 may determine the laser device 206 should operate in an ionizing mode. In addition to determining a laser operation mode, the analyzer 224 may determine a manner of operation; for example, the analyzer 224 may determine one or more aspects of operating the laser, such as power, wavelength, pulse width, and the like. Regardless of the mode and manner the analyzer 224 determines initially, the analyzer 224 may receive additional information from the receiver 222 following activation of the laser device 206 during a first operation time period and determine if the laser operation was effective; if the analyzer 224 determines that the laser operation during the first operation time period was ineffective (or not desirably sufficient) at improving propagation of the RF signals between the base station 202 and the fixed wireless access device 204, the analyzer 224 may modify the mode and/or manner of the laser operation. In one illustrative example, the analyzer 224 may determine whether a first set of one or more pulses during the first operation time period caused a predetermined threshold decrease in propagation loss along at least a portion of the communication path during a first recovery period in which one or more wireless signals were communicated between the base station 202 and the fixed wireless access device 204.

The controller 226 is generally configured to communicate instructions regarding the operation of the laser 206 to the laser 206. The controller 226 is configured to receive instructions from the analyzer 224 and either communicate them to the laser device 206 or to actually cause the laser device 206 to operate in the mode and manner as determined by the analyzer 224. The controller 226 may also be configured to communicate with a scheduler associated with the base station 202; in such an aspect, the controller 226 can communicate to the scheduler that the laser device is to operate in a first operation time period and that the base station 202 should either communicate one or more downlink signals in a first recovery time period or instruct the fixed wireless access device 204 to communicate one or more uplink signals in the first recovery time period, wherein the first recovery time period immediately follows the first operation time period, leveraging the quantum wake created by the laser operation.

Figure 4:
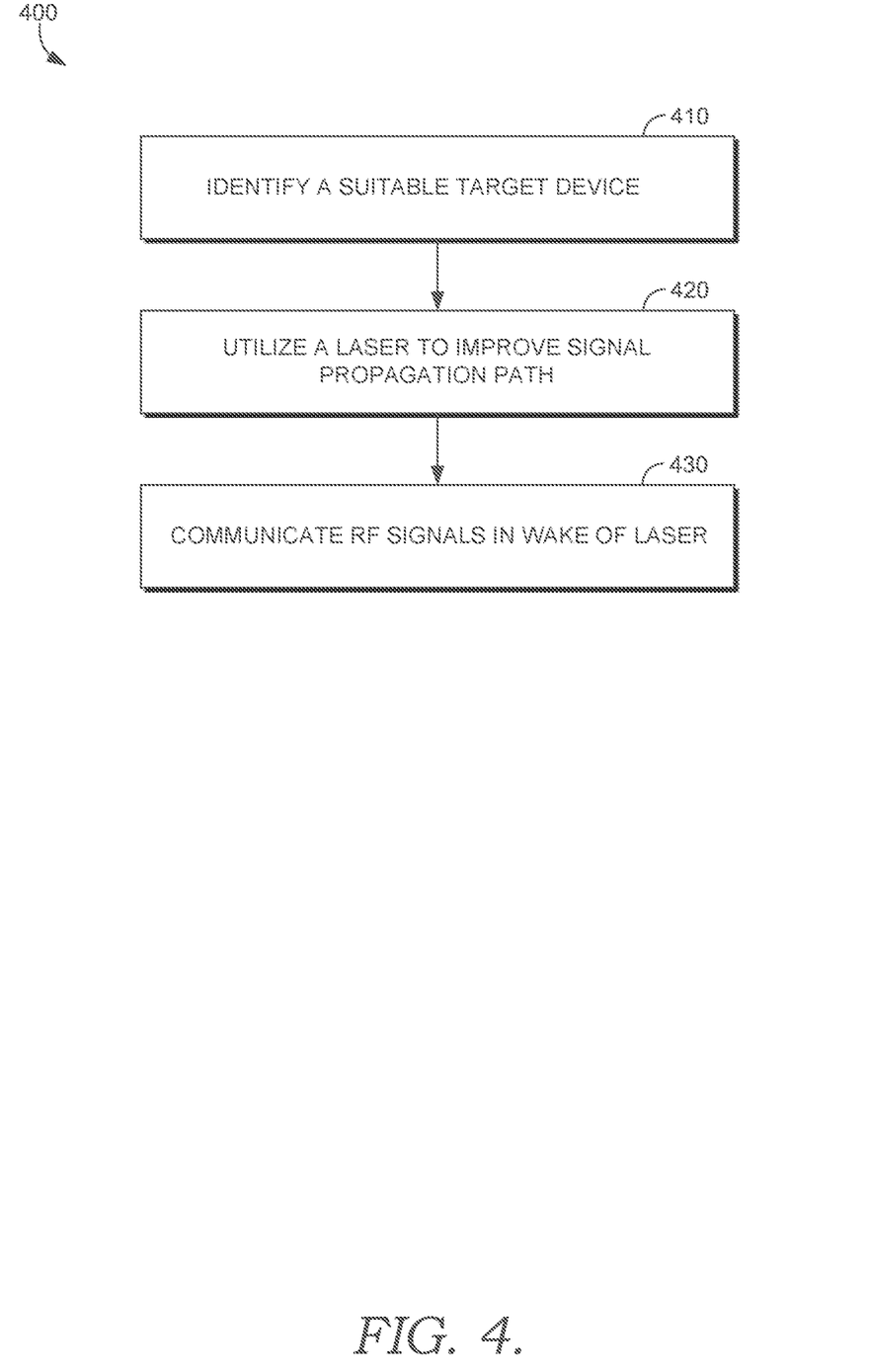
FIG. 4 depicts a flow diagram of an exemplary method for using a laser to increase transmittance of the air interface, in accordance with aspects herein.

Turning now to FIG. 4, a flow chart is provided for a method 400 for using lasers to improve propagation of RF signals. At a first step 410, a suitable target device is identified for use with the laser mitigation technique. According to any one or more aspects described with respect to FIGS. 2-3, a target device may be identified as suitable based on being identified as a fixed wireless access device; in some aspects, the suitability of the target device may be further based on its location within a predetermined range of the cell edge and/or based on one or more network parameters of the connection between the target device and a serving base station. At a second step 420, a laser device is activated, or instructed to be activated, at a first time period an in such a manner that the laser improves the propagation path between the serving base station and the target device, according to any one or more aspects described with respect to FIGS. 2-3. At a third step 430, one or more RF signals are communicated between the target device and the serving base station in a recovery period after the first time period, according to any one or more aspects described with respect to FIGS. 2-3, wherein the recovery period is the amount of time after the first time period in which the propagation path between the serving base station and the target device is in an improved state, relative to before the first time period.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for using a laser to improve wireless signal propagation, the method comprising:
   determine a fixed wireless access device is connected to a base station configured to transmit one or more downlink signals and receive one or more uplink signals within a cell;
   determine one or more network parameters associated with the connection between the fixed wireless access device and the base station exceeds a predetermined threshold;
   determine the fixed wireless access device is within a predetermined distance of the cell edge;
   determine an adverse atmospheric condition is occurring along a communication path between the base station and the fixed wireless access device;
   communicate an instruction to the laser to emit a first set of one or more pulses during a first laser transmission period at least partially along the communication path; and
   communicate the one or more downlink signals from the base station to the fixed wireless access device along the communication path.

2. The method of claim 1, wherein the outermost boundaries of the cell are defined by a cell edge, the network parameter comprises a distance between the fixed wireless access device and the base station, and exceeding the predetermined threshold is defined as being within a threshold distance of the cell edge.

3. The method of claim 1, wherein the network parameter comprises a signal strength.

4. The method of claim 3, wherein the network parameter further comprises a signal quality indicator.

5. The method of claim 1, wherein the first set of one or more pulses causes a predetermined threshold decrease in propagation loss along at least a portion of the communication path for a recovery time period.

6. The method of claim 5, wherein the one or more downlink signals are communicated during the recovery time period.

7. The method of claim 6, wherein the method further comprises:
   communicating an instruction to the fixed wireless access device to transmit the one or more uplink signals to the base station during a second recovery period; and
   communicating an instruction to the laser to emit a second set of one or more pulses during a second laser transmission period at least partially along the communication path, wherein the second laser transmission period is subsequent to the first recovery period and the second recovery period is subsequent to the second laser transmission period.

8. The method of claim 1, wherein the base station is a satellite.

9. The method of claim 1, wherein the first set of one or more pulses is ionizing.

10. The method of claim 1, wherein the first set of one or more pulses is non-ionizing.

11. The method of claim 10, wherein the first set of one or more pulses causes at least a portion of the adverse atmospheric condition along the communication path using rotational heating.

12. The method of claim 11, wherein determining the adverse atmospheric condition is occurring along a communication path between the base station and the fixed wireless access device comprises receiving an indication from one or more meteorological observation sensors.

13. The method of claim 11, wherein determining the adverse atmospheric condition is occurring along a communication path between the base station and the fixed wireless access device comprises receiving an indication from a weather radar.

14. The method of claim 11, wherein determining the adverse atmospheric condition is occurring along a communication path between the base station and the fixed wireless access device comprises receiving an indication from a weather forecast.

15. A system for improving wireless signal propagation, the system comprising:
a first fixed station configured to transmit one or more wireless downlink signals to a second fixed station;
a laser device; and
one or more computer processing components configured to perform operations comprising:
determine one or more network parameters associated with a connection between the first fixed station and the second fixed station exceeds a predetermined threshold, wherein said connection is used to communicate the one or more wireless downlink signals;
communicate an instruction to the laser device to emit a first set of one or more pulses during a first laser transmission period at least partially along a communication path; and
communicate the one or more downlink signals from the first fixed station to the second fixed station along the communication path.

16. The system of claim 15, wherein the one or more network parameters comprises a distance between the first fixed station and the second fixed station and the predetermined threshold comprises a threshold proximity to a cell edge of the first fixed station.

17. The system of claim 15, wherein the one or more network parameters comprises a signal strength indicator.

18. The system of claim 17, wherein the one or more network parameters further comprises a signal quality indicator.

19. The system of claim 18, wherein the first fixed station is a cellular base station and the second fixed station is a fixed wireless access device.

20. One or more non-transitory computer readable media having instructions stored thereon that, when executed by one or more computer processing components, perform a method comprising:
determine one or more network parameters associated with a connection between a first fixed station and a second fixed station exceeds a predetermined threshold, wherein said connection is used to communicate one or more wireless signals;
communicate an instruction to a laser device to emit a first set of one or more pulses during a first laser transmission period at least partially along a communication path used to communicate the one or more wireless signals; and
communicate the one or more downlink signals from the first fixed station to the second fixed station along the communication path during a recovery time period following the first laser transmission period.

* * * * *